United States Patent [19]

Page et al.

[11] Patent Number: 4,557,868

[45] Date of Patent: Dec. 10, 1985

[54] PROCESS FOR PREPARING A PHTHALOCYANINE

[75] Inventors: Geoffrey A. Page; Emery G. Tokoli; Robert T. Cosgrove, all of Rochester; John W. Spiewak, Webster, all of N.Y.

[73] Assignee: Xerox Corporation, Stamford, Conn.

[21] Appl. No.: 624,652

[22] Filed: Jun. 26, 1984

[51] Int. Cl.$^4$ .............................................. C09B 47/04
[52] U.S. Cl. ................................................ 260/245.89
[58] Field of Search ...................... 260/245.86, 245.87, 260/245.88, 245.89

[56] References Cited

U.S. PATENT DOCUMENTS

| | | | |
|---|---|---|---|
| 2,155,038 | 4/1939 | Davies et al. | 260/314 |
| 3,717,493 | 2/1973 | Griswold, Jr. | 106/288 Q |
| 3,825,422 | 7/1974 | Gruber et al. | 96/1 PE |
| 4,032,339 | 6/1977 | Grushkin et al. | 96/1.5 |
| 4,076,527 | 2/1978 | Nealy | 96/1 PE |
| 4,459,233 | 7/1984 | Fabian | 260/245.86 |

FOREIGN PATENT DOCUMENTS

| | | |
|---|---|---|
| 49-43264 | 11/1974 | Japan . |
| 502623 | 3/1939 | United Kingdom . |

OTHER PUBLICATIONS

Ziolo et al., Crystal Structure of Vanadyl Phthalocyanine, Phase II, J. C. S. Dalton, 2300–2302, 1980.

*Primary Examiner*—Paul R. Michl
*Attorney, Agent, or Firm*—Peter H. Kondo

[57] ABSTRACT

A process for preparing vanadyl phthalocyanine particles for photoresponsive devices.

18 Claims, 1 Drawing Figure

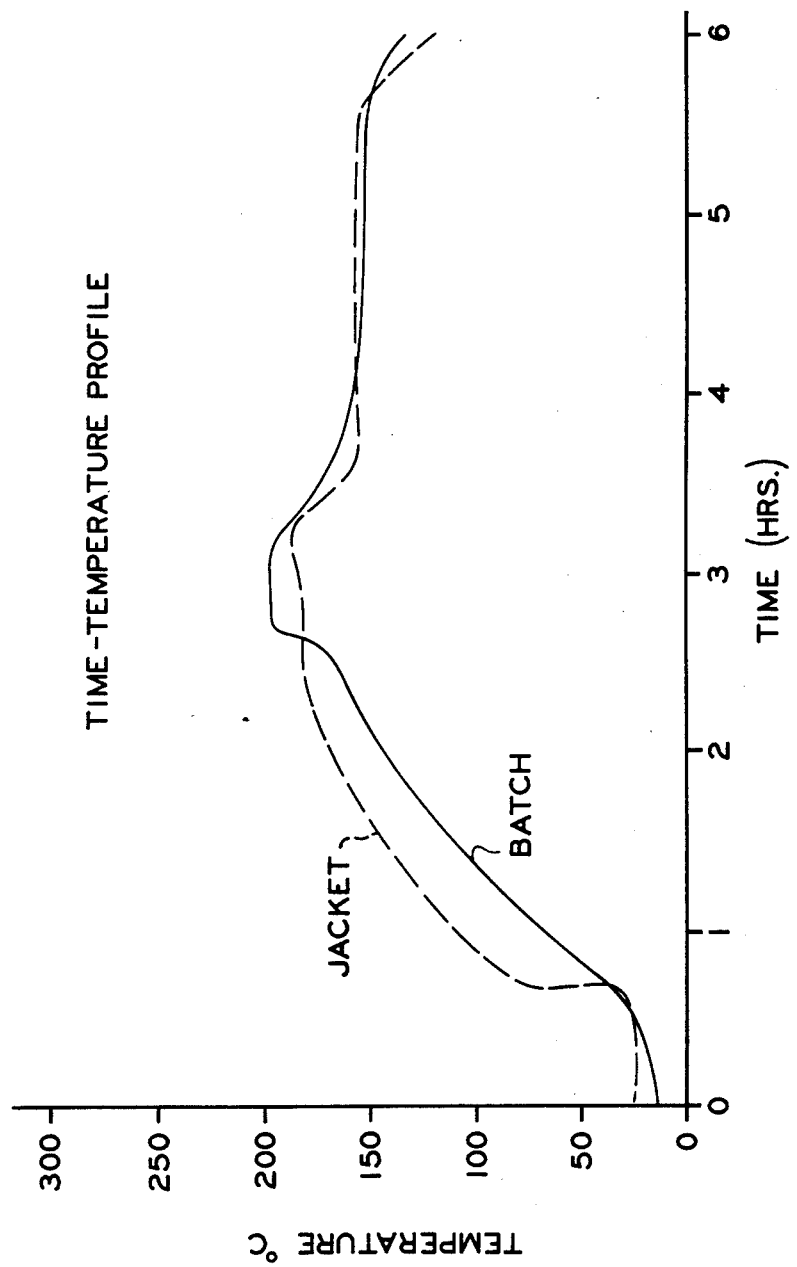

PROCESS FOR PREPARING A PHTHALOCYANINE

BACKGROUND OF THE INVENTION

This invention relates to an improved process for preparing a phthalocyanine composition. More specifically, this invention is directed to the reactive formation and treatment of vanadyl phthalocyanine to achieve improved electrophotographic properties.

The formation and development of electrostatic latent images on the imaging surface of photoconducttive members by electrostatic means is well known. Generally, the method involves the formation of an electrostatic latent image on the surface of an electrophotographic plate, referred to in the art as a photoreceptor. This photoreceptor usually comprises a conductive substrate and one or more layers of photoconductive insulating material. A thin barrier layer may be interposed between the substrate and the photoconductive layer in order to prevent undesirable charge injection.

Many different photoconductive members are known, including, for example, a homogeneous layer of a single material such as vitreous selenium, or a composite layered device containing a dispersion of a photoconductive composition. An example of one type of composite photoconductive member is described, for example, in U.S. Pat. No. 3,121,006. The composite photoconductive member of this patent comprises finely divided particles of a photoconductive inorganic compound dispersed in an electrically insulating organic resin binder. The photoconductive inorganic compound usually comprises zinc oxide particles uniformly dispersed in an electrically insulating organic resin binder coated on a paper backing. The binder materials disclosed in this patent comprise a material which is incapable of transporting for any significant distance injected charge carriers generated by the photoconductive particles. The photoconductive particles must therefore be in substantially contiguous particle to particle contact throughout the layer to permit the charge dissipation required for a cyclic operation. The uniform dispersion of photoconductive particles requires a relatively high volume concentration of photoconductor material, usually about 50 percent by volume, in order to obtain sufficient photoconductor particle to particle contact for rapid discharge. Specific binder materials disclosed in this patent include, for example, polycarbonate resins, polyester resins, polyamide resins, and the like.

Also known are photoreceptor materials comprising inorganic or organic materials wherein the charge carrier generating and charge carrier transport functions are accomplished by discrete contiguous layers. Layered photoresponsive devices including those comprising separate generating and transport layers are described, for example, in U.S. Pat. No. 4,265,990. Additionally, layered photoreceptor materials are disclosed in the prior art which include an overcoating layer of an electrically insulating polymeric material. Overcoated photoresponsive materials containing a hole injecting layer, overcoated with a hole transport layer, followed by an overcoating of a photogenerating layer, and an outer coating of an insulating organic resin are described, for example, in U.S. Pat. No. 4,251,612. Photogenerating layers disclosed in these patents include, for example, trigonal selenium and phthalocyanines and transport layers including certain diamines.

The disclosures of U.S. Pat. Nos. 4,265,990 and 4,251,612 are incorporated herein by reference in their entirety.

Certain phthalocyanine compositions are useful for incorporation into photoresponsive devices to extend the response capability of such devices to include visible light as well as infrared illumination. These photoresponsive devices can be utilized, for example, in conventional electrophotographic copiers as well as in laser printers. Moreover, these photoresponsive devices may comprise single or multilayered members containing photoconductive materials comprising phthalocyanine compositions in a photogenerating layer, between a photogenerating layer and a hole transport layer, or between a photogenerating layer and a supporting substrate.

Vanadyl phthalocyanine has been found to be particularly suitable for photoresponsive devices. Numerous processes are known for preparing and treating vanadyl phthalocyanine. These are described, for example, in U.S. Pat. No. 2,155,038 and U.S. Pat. No. 3,825,422 in which phthalonitrile and vanadium pentoxide reacted in the absence of a solvent. Various other examples are disclosed in U.S. Pat. No. 3,825,422 and U.S. Pat. No. 4,032,339 in which vanadyl phthalocyanine is prepared by utilizing vanadyl trichloride and other co-reactants in the presence of various solvents. The use of vanadium trichloride as a reactant for forming vanadyl phthalocyanine is less desirable because it is a hydrolytically active compound which contributes to instability and the formation of hydrogen chloride.

Phthalocyanines may be treated with sulfuric acid as disclosed, for example, in U.S. Pat. No. 2,155,038; U.S. Pat. No. 3,717,493; U.S. Pat. No. 3,825,422; U.S. Pat. No. 4,032,339; U.S. Pat. No. 4,076,527; British Pat. No. 502,623 (complete specification accepted Mar. 22, 1939) and Japanese Patent Application No. 49-43264, published Nov. 20, 1974.

The particles formed by many of the prior art processes are relatively large and less sensitive to light. Thus, longer exposure times are required which render the materials unsuitable for high speed electrophotographic imaging devices. Moreover, many of the prior art processes involve steps which promote the formation of degradation products which are difficult to remove in subsequent steps and ultimately affect electrical properties of the vanadyl phthalocyanine product. Although treatment with an acid facilitates the formation of smaller particle sizes, difficulties have been encountered achieving very small particle sizes. Moreover, vanadyl phthalocyanine particles cannot simply be physically ground down to the appropriate size because of the tendency of the grinding processes to form particles having very large particle size range distribution including relatively large particles. The classification of ground vanadyl phthalocyanine particles is time consuming and provides a poor yield.

As the art of xerography continues to advance, more stringent standards need to be met by the electrostatographic imaging apparatus to improve performance and to obtain higher quality images. Also desired are layered photoresponsive devices which are more responsive to visible light and/or infrared illumination for certain laser printing applications. As these electrophotographic products become more sophisticated and operate at higher speeds, the operating tolerances become extremely stringent and the predictability of electrical behavior of components can be particularly critical.

While prior art processes for preparing vanadyl phthalocyanine may be suitable for their intended purposes, there continues to be a need for an improved process for preparing vanadyl phthalocyanine having predictable electrical properties.

SUMMARY OF THE INVENTION

It is, therefore, an object of the present invention to provide an improved process for preparing vanadyl phthalocyanine compositions.

It is another object of the present invention to provide an improved process for preparing vanadyl phthalocyaine which is consistently reproducible.

It is yet another object of the present invention to provide an improved process for preparing vandayl phthalocyanine having a very small average particle size.

It is still another object of the present invention to provide an improved process for preparing vanadyl phthalocyanine containing fewer impurities.

It is yet another object of the present invention to provide an improved process for preparing vanadyl phthalocyanine in higher yields.

It is another object of the present invention to provide an improved process for preparing vanadyl phthalocyanine which exhibits higher electrophotographic sensitivity.

It is still another object of the present invention to provide an improved process for preparing vanadyl phthalocyanine which imparts lower dark decay in photoreceptors.

It is yet another object of the present invention to provide an improved process for preparing vanadyl phthalocyanine which exhibits lower residual charge in photoreceptors.

These and other objects of the present invention are accomplished by a providing a process comprising reacting vanadium pentoxide with phthalonitrile and an alcohol at least at an exotherm temperature with agitation, filtering the resulting mixture to form a reaction product pigment cake, washing the reaction product pigment cake at least once with a dipolar aprotic solvent to form a treated pigment cake, drying the treated pigment cake, leaching with agitation the treated pigment cake with a strong acid diluted with water, filtering the resulting mixture to form a leached pigment cake, washing the leached pigment cake at least once with a strong acid diluted with water to form a washed leached pigment cake, washing the leached pigment cake at least once with a solvent comprising water to form a water washed leached pigment cake, forming a strong base slurry by combining the washed leached pigment cake with a strong base diluted with water, heating the strong base slurry with agitation, filtering the resulting mixture to form a strong base treated pigment cake, forming a solvent slurry by combining the strong base treated pigment cake with a dipolar aprotic solvent, heating the solvent slurry with agitation, filtering the solvent slurry to obtain a solvent treated pigment cake, forming an aqueous slurry by combining the solvent treated pigment cake with a solvent comprising water, heating the aqueous slurry with agitation, filtering the aqueous slurry to obtain a washed pigment cake, drying the washed pigment cake, incrementally dissolving with agitation the washed pigment cake in a chilled strong acid to form a chilled solution of vanadyl phthalocyanine, incrementally combining with agitation the solution with chilled water to form a mixture comprising precipitated vanadyl phthalocyanine particles, filtering the resulting mixture to obtain a cake of precipitated vanadyl phthalocyanine particles, forming an aqueous slurry by combining the cake of precipitated vanadyl phthalocyanine particles with a solvent comprising water to form a vanadyl phthalocyanine particle water slurry, heating the vanadyl phthalocyanine particle water slurry, filtering the resulting mixture to obtain a cake of vanadyl phthalocyanine particles, forming an aqueous slurry by combining the cake of precipitated vanadyl phthalocyanine particles with a solvent comprising water to form a vanadyl phthalocyanine particle water slurry; heating the vanadyl phthalocyanine particle water slurry; filtering the resulting mixture to obtain a cake of vanadyl phthalocyanine particles; forming a water slurry by combining the cake of vanadyl phthalocyanine particles with water; filtering the water slurry to form a purified pigment cake of vanadyl phthalocyanine; and drying the purified pigment cake of vanadyl phthalocyanine.

Although the improved process of this invention is divided into three phases to facilitate description, the phases are interrelated and individually and cooperatively contribute to the important reproducible electrical characteristics of the final pigment product. The first phase, Phase I, relates to the synthesis of crude vanadyl phthalocyanine.

The starting reactants of the process of this invention comprise vanadium pentoxide, phthalonitrile, and ethylene glycol. The mole ratio of phthalonitrile to vanadium pentoxide in the reaction mixture is preferably between about 10:1 and about 14:1. A larger excess of phthalonitrile leads to sacrificial loss of phthalonitrile to side reactions resulting in more side product inpurities which must be removed in subsequent process steps. As the above molar ratio is decreased to values less than 12.4:1, yields decrease based on equivalents of vanadium charged. Therefore, at molar ratios of 12.4:1 and higher, all $V_2O_5$ charged is converted to vanadyl phthalocyanine.

Any suitable alcohol having two or more hydroxyl groups and a boiling point of at least about 180° C. may be employed. A boiling point below about 180° C. is normally to be avoided because the alcohol will boil before the reaction mixture can reach exotherm temperatures. With alcohols that boil at temperatures lower than exotherm maximum temperatures, the crude yield of vanadyl phthalocyanine decreases significantly. It is very likely that a pressured vessel can be used at lower temperatures but the need for such more expensive equipment would be wasteful when standard commercial equipment affords nearly quantitative yields at moderate temperature and atmospheric pressure. Typical polyfunctional alcohols include ethylene glycol, propylene glycol, butylene glycol, glycerol and any other mono or polyols having a boiling point of at least about 180° C. Optimum yields are achieved with ethylene glycol. Ethylene glycol is inexpensive, pure and available in bulk. Sufficient alcohol should be employed to dissolve the phthalonitrile and to maintain the reaction mixture as a fluid easily agitated throughout the reaction. Preferably, sufficient alcohol should be present to achieve refluxing of the reaction mixture, to minimize the amount of heat energy required to drive the reaction mixture to the exotherm temperature, and to prevent unduly high reaction mixture temperatures after the exotherm temperature is reached. Unduly high reaction mixture temperatures promote greater side reactions which promote the formation of undesirable impurities. However, excessive amounts of alcohol should be avoided in order to minimize the time and energy requirements to reach exotherm onset and for cooling the mixture after the reaction is substantially completed.

The proportion of alcohol to vanadium pentoxide is preferably between about 3:1 and about 30:1. Sufficient heat should be supplied to the reaction mixture so that the mixture attains the exotherm temperature. The exotherm temperature is defined as the maximum temperature attained in the process when the batch temperature exceeds the jacket temperature in the heat up period.

It is important that the reaction mixture be agitated during the reaction. Vigorous agitation is preferred. Agitation may be accomplished by any suitable means such as propeller mixers, magnetic bar mixers, and the like. To promote turbulence in the reaction mixture, the reaction vessel may contain baffles, irregular interior surfaces, and the like. A typical mixing arrangement comprises a 10 gal. Pfaudler Glasteel reactor with H baffles and a three-blade propeller stirrer rotated at 100 rpm by a 3.73 horsepower motor.

The reaction may be conducted under reduced pressure, atmospheric pressure, or super atmospheric pressure. The pressure selected depends on factors such as the boiling points of the alcohols employed and the effect of pressure on achieving the exotherm temperature. In other words, the pressure should not be so low that the alcohol refluxes before the reaction mixture attains the exotherm temperature. Moreover, super atmospheric pressure may be used with lower boiling point alcohols such as amyl alcohol but the pressure should not be so high as to adversely reverse the reaction. Generally, reactions at atmospheric pressure are preferred to avoid the necessity of special pressurized equipment and to minimize energy consumption for conducting the reaction. For example, the reactor may merely be fitted with a simple water cooled reflux condenser open to the atmosphere of sufficient capacity to condense the solvent vapors.

BRIEF DESCRIPTION OF THE DRAWINGS

A more complete understanding of the process and device of the present invention can be achieved by reference to the accompanying drawing which graphically illustrates a typical temperature versus time profile for the reaction mixture (batch) and heating mantle or oil circulation bath (jacket) in the process of this invention.

A typical time versus temperature profile for the reaction of this invention is illustrated in the drawing. Generally, the reaction may be divided into three segments. The temperature of the heating jacket surrounding the reactor is represented by a dashed line. The temperature of the reaction mixture itself is represented by a solid line. The first segment of the reaction ends at about the point where an abrupt increase in the slope of the curve occurs. This point is the exotherm onset temperature and the maximum temperature attained a short time thereafter is the exotherm temperature. The reaction mixture is preferably heated as rapidly as practical to the exotherm temperature region to minimize the occurrence of side reactions. However, considerable latitude in the rate of temperature increase has been observed. As apparent from the drawing, the jacket temperature was initially greater than the reaction mixture temperature at time 0. Moreover, the temperature of the heating medium in the jacket was allowed to level off at about or slightly prior to the point in time when the reaction mixture attained the exotherm temperature. The temperature of the reaction mixture continued to rise beyond the temperature of the jacket due to the heat generated in the reaction mixture during the exothermic reaction.

The next segment of the reaction is a particularly critical period in which the temperature of the reaction mixture (batch) must be raised above the exotherm onset temperature and must be maintained at the exotherm temperature until substantial completion of the reaction or until the exotherm abates (batch temperature begins to decrease).

After substantial completion of the reaction, which is at about 5.55 hours in the profile illustrated in the drawing, the application of heat to the reaction mixture may be discontinued. This third segment subsequent to the reaction phase is not especially critical and considerable latitude in the manner in which cooling is effected has been observed. Although an oil jacket was employed to heat the reaction mixture, any other suitable conventional heating device may be employed. Typical heating means include heated oil jackets, electric mantels, heated oil circulating baths and the like. Cooling may be effected merely by terminating the addition of heat to the reaction vessel. If desired, cooling may be accelerated by any suitable conventional means.

After completion of the reaction, the reaction mixture may be filtered to obtain a pigment cake. Filtering may be accomplished by any suitable conventional means such as filter cloths and filter paper on ceramic filters and the like. If desired, filtering may be accelerated by the use of a suitable vacuum means. After filtering to form a first pigment cake, the pigment cake is washed with a dipolar aprotic solvent. Any suitable dipolar aprotic solvent may be utilized. Typical dipolar aprotic solvents include dimethyl sulfoxide, N,N-dimethyl acetamide, N-methyl-2-pyrrolidone, sulfolane, N,N-dimethyl formamide, and the like. Generally, it is preferred that the dipolar aprotic solvent be prewarmed to enhance removal of impurities in the reaction mixture and to minimize the time for removing impurities. It is believed that the use of a dipolar aprotic solvent at elevated temperatures causes minor swelling of the vanadyl phthalocyanine pigment which promotes more effective removal of impurities by the solvent. A solvent temperature of at least about 80° C. is preferred for rapid removal of impurities. N,N-dimethyl formamide is a preferred dipolar aprotic solvent because it is stable at 80° C. and higher, pure, available in bulk, and less expensive than the other dipolar aprotic solvents while having equivalent solvent power in removing impurities from the swollen pigment. Washing is usually accomplished by applying the dipolar aprotic solvent onto the pigment cake supported on the filter. The washing step is carried out at least once but may, if desired, be repeated. Moreover, the pigment cake may be additionally washed with a suitable solvent such as an alkanol. Typical alkanols include ethanol, isopropanol, butanol, and the like. This washing step enhances the removal of any pigment imbibed dipolar aprotic solvent which is miscible with the alkanol. The alkanol should be miscible or partially miscible with water since the filtered pigment cake absorbs atmospheric moisture and water miscible alcohols will best remove imbibed water. When one or more alkanol washes are employed, pre-warming of the alkanol prior to washing is preferred for more effective and more rapid removal of alkanol soluble impurities.

The washed filter cake may optionally be treated with any suitable strong base. Typical strong bases include sodium hydroxide, potassium hydroxide, and the like. The base is generally employed as a dilute solution. A dilute solution of between about 3 percent by weight and about 6 percent by weight is preferred. Treatment with a strong base aids in the removal of any vanadium pentoxide or other amphoteric vanadium species remaining in the filter cake. Treatment with a strong base is typically accomplished by forming a slurry with mechanical agitation to form a uniform slurry. A typical strong base treatment may be carried out at between about 70° C. and about 75° C. for about 1 hour. If this optional treatment with a base is employed, the resulting slurry is filtered by any suitable means such as a conventional vacuum filtration system and thereafter washed with pre-warmed deionized water. For reasons of economy and impurity solubilities, the slurry should be vacuum filtered while the slurry is still hot from the treatment with the base. Washing of the filtered pigment cake may be repeated as desired. However, the treatment with the base as well as the subsequent filtering and washing steps are merely optional and may be omitted if desired. If omitted, higher oven drying temperatures may be required to evaporate the higher boiling diprotic apolar solvent.

The pigment cake resulting from the preceeding steps (which may be the cake following the dipolar aprotic solvent treatment step because the subsequent optional steps were omitted) is dried to remove any of the solvents which were utilized to wash the crude pigment. Drying may be carried out by any suitable conventional means such as convection air ovens, vacuum ovens, and the like. A typical drying technique (after strong base slurry and water washes) involves placing the moist pigment cake in oven trays in an air convection oven at between about 65° C. and about 70° C. for at least about 96 hours or until a constant weight is achieved.

The partially dried pigment may be lightly pulverized by any suitable means such as a mortar and pestle, Waring Blender and the like to increase the surface area of the dried pigment for more rapid drying. Drying should be sufficient to reduce the solvent content to less than about 1 percent by weight based on the total weight of the dried pigment. The pulverized dried pigment is preferably protected from direct exposure to light during the following processing steps.

The second phase of this invention, Phase II, involves initial purification steps including permutoid swelling. Permutoid swelling is the leaching out of chemical impurities from the 75 percent sulfuric acid swollen gelantinous mass representing a protonated form of vanadyl phthalocyanine.

The dried pulverized crude pigment is treated with a strong acid. Any suitable strong organic or inorganic acid capable of swelling vanadyl phthalocyanine pigment and dissolving the impurities therein may be employed. Typical strong acids include sulfuric acid, phosphoric acid, methane sulfonic acid, and the like. The concentration of the strong acid should be between about 70 percent by weight and about 80 percent by weight. Concentrations of a strong acid below about 60 percent by weight are less effective in removing sufficient impurities from the crude pigment. Acid concentrations about 80 percent by weight make for lower yields. Sulfuric acid is the preferred strong acid because it is pure and inexpensive. Some of the impurities dissolved by the acid include phthalimide, phthalic acid, phthalamic acid, and phthaldiamide. The pulverized crude dried pigment should be added slowly and incrementally with agitation of the chilled acid at about room temperature. The pigment is added slowly to assist in maintaining the mixture near room temperature to avoid an excessive increase in temperature to levels which may cause minor pigment degradation presumably through hydrolytic pathways. The acid bath is agitated to obtain all the pigment particles in a swollen gelatinous state throughout the addition time period and for 3 hours thereafter. This ensures total solvent contact and swelling thereby improving the efficiency of the leaching process. The pigment may be left in the acid slurry for up to about 20 hours. The acid leached pigment is then filtered by conventional filtering means such as those described above. The resulting filter cake should be washed with additional fresh acid at about room temperature.

The pigment cake after acid washing is washed with a suitable pre-warmed solvent to remove the acid. Preferably, the washing liquid is deionized water. However, other more expensive solvents such as alcohols or alcohol-water mixtures at room temperature may be employed if desired. For reasons of economy, the washing is preferably conducted while the pigment cake from the previous filtering step remains on the filter.

The pigment is mixed with a dilute aqueous base to remove the residual acid. Any suitable dilute aqueous base may be employed. Typical aqueous bases include sodium hydroxide, ammonium hydroxide, potassium hydroxide, and the like. For example, a slurry may be formed with a 4 percent by weight solution of sodium hydroxide and water. The slurry may typically be agitated by mechanical stirring and heated to between about 70° C. and about 75° C. to facilitate removal of residual acid. The slurry mixture may, for example, be held at between about 70° C. and about 75° C. for about 1 hour. Considerable latitude has been observed in regard to the degree of agitation, heating, and time of contact between the base and the pigment. Slurry is thereafter filtered by any suitable conventional means such as those previously described.

If desired, the filtered pigment may be washed with a suitable liquid such as deionized water to remove any impurities remaining in the pigment. However, this washing step is optional and may be omitted.

The pigment cake following washing or following filtering of the slurry (if the washing step is omitted) is thereafter formed into a slurry in combination with a dipolar aprotic solvent to remove the impurities that were not removed during the acid treatment step. The slurry is preferably heated to a temperature between about 80° C. and a temperature below the boiling point of the dipolar aprotic solvent. Agitation may be applied and contact between the pigment particles and the dipolar aprotic solvent may take place for about 1 hour. The hot slurry is then filtered. This slurry formation and filtering steps may be repeated one or more times, if desired. The resulting pigment filter cake may be washed with a dipolar aprotic solvent as described previously. If desired, the pigment cake may also be washed with a solvent such as deionized water. These washing steps with the dipolar aprotic solvent or with the deionized water may be repeated one or more times or omitted altogether.

The pigment cake may thereafter be formed into a slurry with a suitable solvent such as deionized water to remove the dipolar aprotic solvent. Preferably, the slurry is heated to a temperature between about 70° C. and about 75° C. The slurry is typically held at this elevated temperature for about 1 hour. The slurry is thereafter filtered by conventional means such as described above and dried to reduce the water content of the pigment cake to less than about 1 percent by weight water. A low water content is important to prevent excessive dilution of the acid in the subsequent step. Typically, the pigment can be adequately dried by placing the pigment in trays in an air convection oven maintained, for example, at between 65° C. and about 70° C. for at least about 96 hours. The pigment clumps in the trays after partial drying may be lightly pulverized for more rapid drying and more rapid dissolving in the subsequent acid purification step.

The final phase, Phase III, of the process of this invention involves final purification steps including acid pasting. Acid pasting requires the dissolution of the pigment in greater than or equal to 95 percent sulfuric acid, and precipation of said pigment solution to remove impurities and to reduce particle size. Highly controlled conditions are required for solution and precipitate formation.

The dried pulverized vanadyl phthalocyanine pigment is next mixed with a chilled strong acid. Any suitable strong organic or inorganic acid capable of completely dissolving vanadyl phthalocyanine pigment and dissolving the impurities therein may be employed. Typical strong acids include sulfuric acid, phosphoric acid, methane sulfonic acid, and the like. Sulfuric acid is the preferred strong acid because it is pure and inexpensive. The concentration of the strong acid is preferably at least 95 percent by weight. Concentrations of a strong acid at or below about 93 percent by weight caused photoreceptors in which the acid treated vanadyl phthalocyanine pigment were used to exhibit unacceptably high dark decay. The temperature of the acid is preferably maintained at a temperature below about 15° C. although brief temperature spikes as high as, for example, 22° C. can be tolerated. However, sustained temperatures at about room temperature (about 22° C.) caused photoreceptors in which the acid treated vanadyl phthalocyanine pigment were used to exhibit unacceptably high dark decay due, apparently to impurities that were formed and retained from the sustained elevated temperature treatment. Optimum results are achieved when the temperature of the acid is maintained at a temperature between about 5° C. and about 10° C. The quantity of impurities formed in the solution increases with temperature and residence time. The pulverized crude dried pigment should be added slowly and incrementally with agitation of the acid at a temperature below about 15° C. The pigment is added slowly to avoid an excessive increase in temperature exceeding about 15° C. for any sustained time period. The acid bath is vigorously agitated to maintain a more uniform solution temperature and to promote more rapid dissolving of the pigment in the acid. The pigment may be left in the acid solution for between about 2 hours and about 6 hours. Residence times exceeding about 6 hours tends to cause the formation of unacceptably large amounts of impurities. Less than about 2 hours may be feasible depending upon the amount of acid employed relative to the quantity of pigment and the rate of dissolution. Any undissolved pigment, for any reason, should not be ice-water quenched in the next step since high dark decay devices then result.

The pigment-acid solution should next be added slowly and incrementally with agitation into an ice and water bath. If desired, minor amounts of a suitable water miscible acid nonreactive solvent such as alcohols may be added to the ice water bath. However the ice water bath should contain sufficient water to dissolve impurities from the acid-pigment solution. The pigment-acid solution is added slowly to avoid any significant increase in bath temperature exceeding about 15° C. for any sustained time period and to ensure that a small pigment particle size and minimal impurities are formed. Excessively high bath temperatures cause unduly rapid hydrolytic breakdown of the pigment, agglomeration of the pigment particles formed and trapping of impurities in the pigment agglomerates. The acid treated pigment may be introduced into the ice water bath in the form of one or more streams to promote more rapid dissipation of heat. The introduction should not be so slow as to unduly extend the pigment residence time in the strong acid thereby allowing high levels of impurities to form prior to quenching in the ice water. A typical introduction time is about 1.75–2 hours. Excellent results are achieved, for example, with a single stream feed rate of about 150 to about 200 ml./min. into a bath containing deionized water containing and ice. Preferably the pigment is introduced into the ice water bath at a rate sufficient to form particles having an average particle size less than about 0.1 micrometer at a bath temperature maintained at less than about 15° C. The bath must be vigorously agitated to maintain a more uniform bath temperature and to promote more rapid dispersing of the pigment in the ice water bath. Any suitable conventional agitation means, such as those previously described above, capable of vigorously agitating the bath may be employed. To promote turbulence in the reaction mixture, the reaction vessel may contain baffles, irregular interior surfaces, and the like. Solid particles of ice (part of the 196 lbs.) may periodically be added to the bath to ensure that the bath is maintained at a temperature less than about 15° C. for any sustained time period. However, the ice particles should not be in such quantity that they adversely affect proper agitation of the bath. Optimum results are achieved when the temperature of the bath is maintained at a temperature between about 5° C. and about 10° C. If desired, other suitable cooling means such as refrigerated cooling coils submerged in the bath may be substituted for or employed in conjuction with the ice particles. However, if another suitable cooling source other than internally added ice is used, a corresponding volume of cold water should be used in place of the ice. The pigment may be left in the ice water bath for up to about 0.5 hours and is then filtered by conventional vacuum filtering means such as those described above and in the Examples which follow. The resulting filter cake was washed on the funnel with prewarmed deionized water and was then slurried in 25 gallons of deionized water heated to 70°–75° C. for one hour. The hot pigment slurry was next vacuum filtered.

The pigment cake is next formed into a slurry with a concentrated weak base or a dilute strong base. Any suitable base may be employed. Typical weak bases include ammonum hydroxide, calcium hydroxide, and the like. Typical strong bases include potassium hydroxide, sodium hydroxide, and the like. Preferably, the slurry is formed with concentrated ammonum hydroxide because this base is most capable of extracting impurities from the organic pigment. The pigment cake must be formed into a slurry with a dilute base with agitation and thereafter filtered at least once in order to prevent unacceptable dark decay in the final photreceptor. The first slurry is typically heated to about 70° C. and about 75° C. and held at this elevated temperature for about 1 hour.

The pigment cake is thereafter formed into a slurry with deionized water and with agitation to remove the base and impurities. The pigment cake must be formed into a slurry with water and thereafter filtered at least once in order to prevent unacceptable dark decay in the final photoreceptor. If desired, minor amounts of a suitable water miscible nonreactive solvent such as alcohols may be added to the slurry. Preferably, the slurry is heated to a temperature between about 70° C. and about 75° C. The slurry is typically held at this elevated temperature for about 1 hour. The slurry is thereafter vacuum filtered, preferably while still hot, by conventional means such as those described above and in the working examples below. The steps of forming a pigment cake into a slurry with water and thereafter filtering the slurry must be carried out a sufficient number of times to reduce the conductivity of the filtrate to less than about 10 micromhos. If the conductivity of the filtrate is greater than about 10 micromhos, the final photoreceptor has been found to exhibit unacceptable dark decay.

The pigment cake may then be dried by any suitable conventional technique. The pigment clumps in the trays are preferably pulvurized at least once during drying to expose more surface area of the pigment particles. Typically, the pigment can be adequately dried by placing the pigment in trays in an air convection oven maintained, for example, at between 65° C. and about 70° C. for at least about 96 hours. Additional, more complete drying may be accomplished by conventional processes such as drying in a vacuum oven at 65° C.-70° C. and a vacuum of about 0.5 mm mercury for about 16 or more hours. The pigment may then be bagged and stored in the absence of light.

The invention will now be described in detail with respect to specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Phase I: Synthesis of Crude Vanadyl Phthalocyanine Pigment (VOPc)

Synthesis: A 10 gal glasteel Pfaudler reactor was charged with 23.76 liters of ethylene glycol, 829.4 grams vanadium pentoxide and 7257 grams phthalonitrile and was agitated at 70 rpm with a propeller mixer. A time-temperature profile is indicated for the synthesizing events in the following table. The drawing illustrates a corresponding graphic description.

TABLE

| Cumulative Time (Hours) | Temperature °F. Temperature °C. | Event |
|---|---|---|
|  |  | STARTUP |
| 0–.75 | 70–90<br>21–32 | Charge Reactor and Heat Oil Heater Loop |
|  |  | HEATUP OR SEGMENT I |
| .75–2.65 | 90–345<br>32–174 | Open Heater Loop to Batch and Heatup to Exotherm Onset: at 194° F. (90° C.) Set Agitator to 100 RPM |
|  |  | SEGMENT II |
| 2.65–3.55 | 345–390–345<br>174–199–174 | Exotherm Period |
|  |  | and |
| 3.55–5.55 | 345–320<br>174–160 | Post Exotherm Period |
|  |  | SEGMENT III |
| 5.55–6.55 | 320–200<br>160–93 | Cool Down and Drop Reactor Contents for Filtration |

A water condenser was adapted to the reactor for the moderate reflux occurring during the exotherm period. After the reactor contents cooled to 90° C.–95° C. (194° F.–203° F.), the hot pigment slurry was transferred to a vacuum filter. After suction filtering the pigment cake, the latter was washed on an evacuated ceramic funnel with prewarmed (80° C.–85° C.) dimethylformamide in 2 gal. quantities. A total of four sequential pigment washes with dimethylformamide was followed by one prewarmed isopropanol (1.4 gas at 55° C.) wash. The latter helped remove the higher boiling dimethylformamide residues in the pigment cake.

To a 30 gal. steam jacketed stainless steel tank was added 3447 grams of sodium hydroxide and 22.8 gal. (86.3 l) of deionized water to give about a 4% sodium hydroxide solution. The pigment cake was transferred from the ceramic funnel and the resulting alkaline pigment slurry was heated to 70° C.–75° C. with agitation (400–500 rpm) with a propeller mixer and was held in that temperature range for one hour while stirring. The pigment slurry was then vacuum filtered and the filter cake was washed on a ceramic funnel with 10 gal. of prewarmed (70° C.–75° C.) deionized water while maintaining vacuum filtration (pump) conditions. The moist pigment cake was transferred to the above described stainless steel tank and a hot deionized water slurry (25 gal. of water) was prepared under the same conditions as above. After vacuum filtration of the pigment slurry, the pigment cake was washed on the funnel with 5 gal. of prewarmed (70° C.–75° C.) dieionized water. The moist pigment was transferred to drying trays which were placed in an air convection oven at 65° C.–70° C. for more than 96 hours. The dried crude pigment was lightly pulverized and weighed 4,850 grams (92% yield based upon equivalents of vanadium in vanadium pentoxide charged).

Phase II: Initial Purification: Permutoid Swelling

In this phase, the crude pigment was leached with 75% sulfuric acid which dissolved and removed impurities from the undissolved but solvent swollen pigment particles. The impurities were thermally generated in the synthesis, probably from the excess phthalonitrile, and were leached out as such or were hydrolyzed in the 75% sulfuric acid. In any case, the original impurities and hydrolysis by-product impurities were bulk removed in this purification process.

To a 30 gal. polytank, externally cooled with ice and water, was added 50.16 lbs of ice and then 44.1 l of 96% sulfuric acid. Mechanical agitation was begun when enough acid had been added to the ice to give a substantial liquid phase. External cooling was continued until the 75% sulfuric acid solution reached 22° C.

The crude vanadyl phthalocyanine, 4850 grams, was added portionwise over 15–20 minutes to the slowly agitated 75% sulfuric acid solution prepared above. The slurry remained at or near room temperature during the addition and for 3 hours thereafter while stirring was maintained. The polytank was sealed from the atmosphere with a plastic sheet and the pigment acid mass was allowed to stand undisturbed overnight (16–20 hrs.) at ambient temperature.

One-third of the pigment acid mass was transferred to the filter and was pulled down with vacuum. The pigment paste was washed on the filter cloth of the filter with about 4 l of fresh 75% sulfuric acid at room temperature. After removing the liquid by suction, the pigment paste was combed from the filter cloth and was transferred to another polytank containing 6 gal. of deionized water. The second third of the pigment acid mass was filtered and transferred in an identical manner. The final third was similarly filtered to which was added the previously collected pigment and its aqueous medium. In this way, all the pigment was collected on the funnel and vacuum filtered. The wet cake was then washed on the filter with 6–8 gal. of prewarmed (70° C.–75° C.) deionized water while vacuum filtering.

To the 30 gal. jacketed stainless steel tank was added 2,585 grams of sodium hydroxide and 64.34 l of deionized water to give about a 4% alkali solution. The above water washed pigment cake was added and the alkaline pigment slurry was heated to 70° C.–75° C. with moderate mechanical stirring. Stirring and heating were maintained for one hour before filtering the hot slurry. The moist pigment cake was next slurried with 22 gal. of deionized water in the same container using the same conditions and was filtered in the usual manner. The moist pigment on the filter cake was next washed with 5 gal. of prewarmed (70° C.–75° C.) deionized water.

Three dimethylformamide pigment slurries were sequentially carried out in an 18 gal. jacketed stainless steel tank. The above moist pigment cake and 8 gal. of dimethylforamide were heated to 80° C. with stirring. After one hour at the aforementioned temperature, the pigment slurry was vacuum filtered. The procedure described in this paragraph was repeated two more times and the final filter cake was washed on the funnel with prewarmed (80° C.) dimethylforamide (2×4 l) and then with prewarmed (70° C.–75° C.) deionized water (2×5 gal.).

Finally, the pigment was slurried with 22 gal. deionized water in the 30 gal. jacketed stainless steel tank in the usual manner wherein the contents were held at 70° C.–75° C. for one hour. After vacuum filtration, the moist pigment was air dried on the funnel (4 hours–6 hours) and was then transferred to drying trays. The pigment was dried for at least 96 hours at 65° C.–70° C. after which time it was gently pulverized. The yield was 426 grams or 88% of partially purified vanadyl phthalocyanine.

Phase III: Final Purification: Acid Pasting

In this phase, the partially purified pigment was dissolved in 96% sulfuric acid which also dissolved any residual impurities not removed by the above leaching process. Subsequent quenching of the pigment acid solution into ice water accomplished two tasks. Average particle size was reduced on the average from 1 micrometer–2 micrometers to 200 Angstroms–600 Angstroms. Moreover, the aqueous acid (about 25% sulfuric acid results when the quenching is complete) formed, dissolved away soluble impurities.

The 96% sulfuric acid (24.5 liters) was chilled to 6° C.–10° C. over a period of 1.5 hours–2.0 hours while minimizing the amount of atmospheric moisture condensing into the cold acid. The semi-purified pigment (2100 grams) was incrementally (about 300 gram portions) added to the cold concentrated sulfuric acid over a period of 1.75 hours–2.00 hours while maintaining a batch temperature of 6°–15° C. with external cooling. A stir rate of at least 100 rpm with a propeller mixer was maintained throughout the addition period and for one hour thereafter during which time the temperature of the pigment-acid solution was 10° C.–15° C.

The cold pigment acid solution was stream fed at an addition rate of 175 plus or minus 25 ml/min into a 55 gal. polytank containing 10.3 gal. of deionized water and sufficient ice to chill the contents of the polytank to 5° C.–10° C. The remainder of the original 196 lbs. of ice was incrementally added during the pigment acid solution addition period. An excess of ice, wherein the vortex was impeded, was avoided and the stir rate was maintained at 800 rpm–1000 rpm. The total uninterrupted time for the pigment acid solution addition was 2.67 hours–2.83 hours and the tank contents remained at 8° C.–12° C. throughout. The total residence time of the pigment in the acid was less than 6 hours prior to ice water quenching. After stirring the tank contents at 400 rmp–500 rpm for 0.5 hours beyond the time required to complete the addition, the cold dilute acid pigment slurry was vacuum filtered. The filtration was slow (overnight) and the yellow filtrate showed no evidence of fines. In the morning, the filter cake was washed on the funnel with prewarmed (70° C.–75° C.) deionized water (5×2 gal.). Residual acid was removed by slurrying the pigment in 25 gal. of deionized water heated to 70° C.–75° C. for one hour in a 30 gal. jacketed stainless steel tank. The hot pigment water slurry was vacuum filtered.

The following three ammonium hydroxide slurries were prepared to remove residual sulfuric acid as ammonium sulfate. The same previously described 30 gal. vessel was used in the process and the stir rate (400–500 rpm) and heating period (one hour) at elevated temperature (70° C.–75° C.) were the same. Each slurry was followed by a vacuum filtration step.

First NH4OH slurry: 15.5 gal deionized water and 7.8 l conc. NH4OH

2nd NH4OH slurry: 16.8 deionized water and 4.9 l conc. NH4OH

3rd NH4OH slurry: 16.8 gal deionized water and 4.9 l conc. NH4OH

The purpose of the remaining 6 deionized water slurries was to reduce the level of ionic species in the pigment particles as measured by conductivity in units of micro mhos. An acceptable pigment slurry filtrate value of less than about 10 micromhos (at room temperature) must be achieved to insure that the pigment was sufficiently free of ionic contamination for precision photoreceptors.

The equipment and conditions described for the ammonium hydroxide slurries were maintained. Instead, 22 gal–25 gal. of deionized water was used in each slurry and generally 6–8 slurries were required to lower the conductivity to less than about 10 micromhos.

The finally filtered pigment was transferred to trays for convection oven drying. The pigment was dried for four days at 60° C.–65° C. and any pigment chunks were manually broken and the pigment thereafter dried another 24 hours at the same temperature. The pigment was next pulverized with a mortar and pestle and drying was resumed in a vacuum oven at the same temperature for 16 hours at 0.5 mm Hg. Finally, the pigment was bagged and stored in the absence of light.

EXAMPLE II

Phase I: Synthesis of Crude Vanadyl Phthalocyanine Pigment (VOPc)

Synthesis: A 10 gal glasteel Pfaudler reactor was charged with 23.76 liters of ethylene glycol, 829.4 grams vanadium pentoxide and 7257 grams phthalonitrile and was agitated at 70 rpm with a propeller mixer. A time-temperature profile is indicated for the synthesizing events in the following table. The drawing illustrates a corresponding graphic description.

TABLE

| Cumulative Time (Hours) | Temperature °F. Temperature °C. | Event |
| --- | --- | --- |
| | | STARTUP |
| 0–.75 | 70–90 21–32 | Charge Reactor and Heat Oil Heater Loop |
| | | HEATUP OR SEGMENT I |
| .75–2.65 | 90–345 32–174 | Open Heater Loop to Batch and Heatup to Exotherm Onset: at 194° F. (90° C.)Set Agitator to 100 RPM |
| | | SEGMENT II |
| 2.65–3.55 | 345–390–345 174–199–174 | Exotherm Period and |
| 3.55–5.55 | 345–320 174–160 | Post Exotherm Period |
| | | SEGMENT III |
| 5.55–6.55 | 320–200 160–93 | Cool Down and Drop Reactor Contents for Filtration |

A water condenser was adapted to the reactor for the moderate reflux occurring during the exotherm period. After the reactor contents cooled to 90° C.–95° C. (194° F.–203°F.), the hot pigment slurry was transferred to a vacuum filter. After suction filtering the pigment cake, the latter was washed on an evacuated ceramic funnel with prewarmed (80° C.–85° C.) dimethylformamide in 2 gal. quantities. A total of four sequential pigment washes with dimethylformamide was followed by one prewarmed isopropanol (1.4 gal at 55° C.) wash. The latter helped remove the higher boiling dimethylformamide residues in the pigment cake.

To a 30 gal. steam jacketed stainless steel tank was added 3447 grams of sodium hydroxide and 22.8 gal. (86.3 l) of deionized water to give about a 4% sodium hydroxide solution. The pigment cake was transferred from the ceramic funnel and the resulting alkaline pigment slurry was heated to 70°–75° C. with agitation (400–500 rpm) with a propeller mixer and was held in that temperature range for one hour while stirring. The pigment slurry was then vacuum filtered.

Two dimethylformamide pigment slurries were sequentially carried out in an 18 gal. jacketed stainless steel tank. The above moist pigment cake and 8 gal. of dimethylforamide were heated to 80° C. with stirring. After one hour at the aforementioned temperature, the pigment slurry was vacuum filtered. The procedure described in this paragraph was repeated and the final filter cake was washed on the funnel with prewarmed (80° C.) dimethylforamide (2×4 l) and then with prewarmed (70° C.–75° C.) deionized water (2×5 gal.).

Finally, the pigment was slurried with 22 gal. deionized water in the 30 gal. jacketed stainless steel tank in the usual manner wherein the contents were held at 70° C.–75° C. for one hour. After vacuum filtration, the moist pigment was air dried on the funnel (4 hours–6 hours) and was then transferred to drying trays. The pigment was dried for at least 96 hours at 65° C.–70° C. after which time it was gently pulverized. The yield was 426 grams or 88% of partially purified vanadyl phthalocyanine.

Phase II was omitted.

Phase III: Final Purification: Acid Pasting

In this phase, the partially purified pigment was dissolved in 96% sulfuric acid which also dissolved any residual impurities not removed by the above leaching process. Subsequent quenching of the pigment acid solution into ice water accomplished two tasks. Average particle size was reduced on the average from 1 micrometers–2 micrometers to 200 Angstroms–600 Angstroms. Moreover, the aqueous acid (about 25% sulfuric acid results when the quenching is complete) formed, dissolved away soluble impurities.

The 96% sulfuric acid (24.5 liters) was chilled to 6° C.–10° C. over a period of 1.5 hours–2.0 hours while minimizing the amount of atmospheric moisture condensing into the cold acid. The semi-purified pigment (2100 grams) was incrementally (about 300 gram portions) added to the cold concentrated sulfuric acid over a period of 1.75 hours–2.00 hours while maintaining a batch temperature of 6°–15° C. with external cooling. A stir rate of at least 100 rpm with a propeller mixer was maintained throughout the addition period and for one hour thereafter during which time the temperature of the pigment-acid solution was 10° C.–15° C.

The cold pigment acid solution was stream fed at an addition rate of 175 plus or minus 25 ml/min into a 55 gal. polytank containing 10.3 gal. of deionized water and sufficient ice to chill the contents of the polytank to 5° C.–10° C. The remainder of the original 196 lbs. of ice was incrementally added during the pigment acid solution addition period. An excess of ice, wherein the vortex was impeded, was avoided and the stir rate was maintained at 800 rpm–1000 rpm. The total uninterrupted time for the pigment acid solution addition was 2.67 hours–2.83 hours and the tank contents remained at 8° C.–12° C. throughout. The total residence time of the pigment in the acid was less than 6 hours prior to ice water quenching. After stirring the tank contents at 400 rpm–500 rpm for 0.5 hours beyond the time required to complete the addition, the cold dilute acid pigment slurry was vacuum filtered. The filtration was slow (overnight) and the yellow filtrate showed no evidence of fines. In the morning, the filter cake was washed on the funnel with prewarmed (70° C.–75° C.) deionized water (5×2 gal.). Residual acid was removed by slurrying the pigment in 25 gal. of deionized water heated to 70° C.–75° C. for one hour in a 30 gal. jacketed stainless steel tank. The hot pigment water slurry was vacuum filtered.

The following four ammonium hydroxide slurries were prepared to remove residual sulfuric acid as ammonium sulfate. The same previously described 30 gal. vessel was used in the process and the stir rate (400–500 rpm) and heating period (one hour) at elevated temperature (70° C.-75° C.) were the same. Each slurry was followed by a vacuum filtration step.

First NH₄OH slurry: 15.5 gal deionized water and 7.8 l conc. NH₄OH

2nd NH₄OH slurry: 16.8 gal deionized water and 4.9 l conc. NH₄OH

3rd NH₄OH slurry: 16.8 gal deionized water and 4.9 l conc. NH₄OH

4th NH₄OH slurry: 16.8 gal deionized water and 4.9 l conc. NH₄OH

The purpose of the remaining 6 deionized water slurries was to reduce the level of ionic species in the pigment particles as measured by conductivity in units of micro mhos. An acceptable pigment slurry filtrate value of less than about 10 micromhos (at room temperature) must be achieved to insure that the pigment ws sufficiently free of ionic contamination for precision photoreceptors.

The equipment and conditions described for the ammonium hydroxide slurries were maintained. Instead, 22 gal-25 gal. of deionized water was used in each slurry and generally 6-8 slurries were required to lower the conductivity to less than about 10 micromhos.

The finally filtered pigment was transferred to trays for convection oven drying. The pigment was dried for four days at 60° C.-65° C. and any pigment chunks were manually broken and the pigment thereafter dried another 24 hours at the same temperature. The pigment was next pulverized with a mortar and pestle and drying was resumed in a vacuum oven at the same temperature for 16 hours at 0.5 mm Hg. Finally, the pigment was bagged and stored in the absence of light.

EXAMPLE III

A series of vanadyl phthalocyanine samples prepared with the procedure of Example I were studied by the TGA technique to determine their purity. The percentages of weight loss for each vanadyl phthalocyanine sample at various temperatures were tabulated and shown in the table below. As apparent from the Table, all the vanadyl phthalocyanine samples contain a small amount of impurities as indicated by the onset of weight loss at low temperatures (T less than 105° C.) and the total weight loss at 400° C. The weight loss below 105° C. is probably due to residual water and solvent. Weight loss at 300° C. may be due to impurities such as phthalonitrile, phthalic acid, phthalimide, phthaldiamide, and phthalamic acid. These organic impurities may affect the electrical properties of the photoconductive pigment. Almost all the pigments (except Sample 4) were not totally dried as shown by the data of onset of weight loss (T less than 170° C.). TGA values beyond 400° C. have no meaning with respect to impurities because vanadyl phthalocyanine itself begins to sublime. The specific procedures and equipment for determining the weight loss included a Perkin Elmer Thermogravimetric System (Model TGS-2) equipped with an AR-2 Autobalance, a microprocessor (System-4) and a Hitachi X-Y recorder was used in this Example. Helium was employed as a carrier gas to provide an inert atmosphere inside the furnace and the furnace tube. The flow rate of the He gas was set at about 60 ml/min. The Thermogravimetric (TGA) instrument was calibrated by the microprocessor to ensure accurate temperature measurements before the analyses began. A vanadyl phthalocyanine sample (about 2-7 mg) was placed in a platinum pan and its weight was accurately measured. About 90% of the sample weight was suppressed so that the full scale of the chart paper represents 10% of total weight loss. This practice allows detection of a very small change in weight loss due to the temperature change. For volatile materials other than the pigment, sample weight was not suppressed. The experiments were conducted in a programmed mode. The sample was allowed to equilibrate at 30° C. for one minute and then heated to 500° C. at a rate of 20° C./min. The pigment sample was cooled down immediately once it reached 500° C. The recorded TGA trace was used to determine % of weight losses at various temperatures. The weight loss data at various temperatures up to about 450° C. (T less than 450° C.) are quite good and reproducible. The weight loss values at greater than 400° C. are slightly less accurate because of rapid sublimation of the pigment which can vary with its particle size, sample distribution in the holder, crystallinity, and sample size.

TABLE

Thermogravimetric Analysis of Vanadyl Phthalocyanine Samples Percent of Weight Loss at Various Temperatures

| Sample No. | Pigment I.D. No. | Onset of Wt. Loss | 200° C. | 250° C. | 300° C. | 350° C. | 400° C. |
|---|---|---|---|---|---|---|---|
| 1. | 15558-63 | 50° C. | 0.14 | 0.18 | 0.22 | 0.28 | 0.35 |
| 2. | 15558-65 | 70° C. | 0.14 | 0.16 | 0.19 | 0.23 | 0.29 |
| 3. | 15558-76 | 190° C. | 0.03 | 0.07 | 0.12 | 0.17 | 0.24 |
| 4. | 15558-89 | 50° C. | 0.13 | 0.18 | 0.25 | 0.31 | 0.40 |
| 5. | 15558-95 | 150° C. | 0.06 | 0.16 | 0.20 | 0.29 | 0.35 |
| 6. | 15558-101 | 50° C. | 0.12 | 0.20 | 0.28 | 0.35 | 0.45 |
| 7. | 15558-103 | 45° C. | 0.11 | 0.20 | 0.26 | 0.31 | 0.36 |
| 8. | 15558-6 | 75° C. | 0.08 | 0.13 | 0.20 | 0.27 | 0.36 |
| 9. | 20162-8 | 95° C. | 0.06 | 0.12 | 0.19 | 0.23 | 0.30 |
| 10. | 20162-10 | 50° C. | 0.12 | 0.21 | 0.30 | 0.38 | 0.44 |
| 11. | 20162-18 | 65° C. | 0.10 | 0.20 | 0.29 | 0.34 | 0.40 |
| 12. | 20162-20 | 65° C. | 0.12 | 0.25 | 0.33 | 0.40 | 0.49 |

Samples 1 through 12 were found to contain acceptable volatile impurity levels of less than about 0.5 percent by weight based on the weight of the pigment for use in electrophotographic imaging members. At less than or equal to 0.5 weight percent impurity level, dark decay values remain acceptable (less than or equal to 50 volts/sec).

EXAMPLE IV

The vanadyl phthalocyanine pigment produced by the process of Example I was incorporated into a single layer photoreceptor. The photoreceptor was prepared in three steps. First the vanadyl phthalocyanine pigment was dispersed in a polyester binder polymer dissolved in methylene chloride solvent. Second, the dispersion was coated on an aluminum substrate, and third, the coating was dried to remove the solvent. In the first step, 1.77 gms polyester binder polymer (PE-200 from Goodyear Tire & Rubber Co.) was weighed on an analytical balance with an accuracy of plus or minus 0.01 mgm. and added to a 2 oz. amber bottle with a polyseal cap. 21.4 gms methylene chloride solvent (reagent grade quality) solvent was next added directly to the 2 oz. bottle as it was weighed on a top loading balance with an accuracy of plus or minus 10 mgm. This container with the above ingredients was placed on a wrist action shaker to dissolve the polymer. 0.43 gm of vanadyl phthalocyanine pigment was weighed out on the analytical balance and added to this solution. 150 gms stainless steel shot (⅛ in. #302 grade burnishing balls—Superior Ball Co., 100 Willington St., Hartford, Conn. 06106) was added to the bottle after weighing on the top loading balance. The steel shot had been previously washed with methylene chloride to remove residual oils and dried in an oven at 100° F. The bottle with these ingredients was then placed on the shaker (Cat. No. 5100X Red Devil, Inc., Union, N.J.) for 90 minutes to disperse the pigment. The dispersions were allowed to cool to room temperature before coating.

The dispersion as prepared above was coated onto brush-grained aluminum (Brush Grained Aluminum Plates Lkk. 10 in.×16 in., Ron Ink Company, Inc., 61 Halstead St., Rochester, N.Y.) using a Gardner Mechanical Drive Film Applicator Model AG-3862 (Gardner Laboratory, Inc. Box 5728, 5521 Landy lane, Bethesda, Md. 20014) with a Bird Film Applicator (Gardner Laboratory, Inc. Box 5728, 5521 Landy Lane, Bethesda, Md. 20014). The brush-grained aluminum plate was cut to 6 in.×10 in. and was coated in the long direction. The wet film thickness was 3 mils (75 micrometers) with a coating width of 3 in. The coating was done in a glove box (Cat. No. 50004/5 Labcamco Corp., Kansas City, Mo. 64132) with the gloves removed and plastic slit shields installed in their place. The box was purged under continuous positive pressure with a flow of dry air to maintain a relative humidity of less than 20%. The dispersion was placed onto the aluminum plate (previously washed with methylene chloride) in front of the Bird Film Applicator using a 3-inch medicine dropper pipett.

The coated plate was allowed to dry in the dry box for 30 min. Next it was placed in a vacuum (Cat. No. 31566 Precision Scientific Co., U.S.A.) oven and held at room temperature at a vacuum pressure (DUO Seal Vacuum Pump Model 1405 Welch Scientific Co., 7300 N. Linder Ave., Skokie, Ill. of about 30 in. of Hg for 1 hour. Then it was heated to 55° C. for 17 hours. The plate was removed from the oven and allowed to cool to room temperature. The thicknesses of the photoreceptor was then measured with the Permascope Type EC 8e2Ty (Twin City Testing Corporation, P.O. Box 248, Tonawanda, N.Y. 14150). The thickness for the single layer photoreceptor was about 10 micrometers.

Electrical measurements were made on a flat plate scanner. The scanner consisted of a motor driven reciprocating belt onto which was placed the photoreceptor sample. Because of the flexible belt, the sample is first mounted on a thick (50 mm) aluminum palte (5×5 cm$^2$) which fits on top of the belt and is normally grounded. The belt and sample are first moved about 2 in./sec. under a corotron where the sample is charged positively to the corotron. The belt and sample are then moved to an image exposure station. The image exposure station comprises a light source, filter, electronic shutter and an electrometer. In the image exposure position, the surface potential is monitored with a capacitively coupled ring probe connected to a Keithley electrometer (Model 610C) (Keithley Instruments Inc., 28775 Aurora Road, Cleveland, Ohio 44139) in the coulomb mode. The output of the electrometer is displayed on a strip chart recorder (HP Model 7402A) (Hewlett Packard Inc.) which is calibrated by applying known voltages on an uncoated (bare plate) sample. The dark discharge was measured with the shutter closed and the discharge to a known light intensity was recorded with the shutter open. A strip chart recording of the voltage as a function of time was prepared. The chart recorder speed was 125 mm/sec. An initial rise in the voltage was observed due to the charged sample moving under the probe. A peak voltage ($V_{DDP}$) of about 680 volts was observed when the sample stopped. From this peak voltage on, the voltage decreased due to dark discharge, providing a measure of the dark discharge rate. To measure photodischarge the shutter was opened when the peak voltage was attained and the photoreceptor exposed to light of constant intensity. The light was filtered with first order interference and neutral density filters to give a flux of 32 ergs/cm$^2$/sec at 597 nm. Discharge did not begin immediately but followed an "induction period." The sensitivity of the photoreceptor was characterized by two parameters; the maximum discharge rate per exposure and the exposure required to reach the maximum rate. Since the latter usually occurs when the voltage is half the value of $V_{DDP}$ at time=0, it is measured as the exposure from time=0 to time that $\frac{1}{2}$ $V_{DDP}$ is attained. The slope of a line drawn tangent to the curve on the strip chart at the maximum discharge, gave a 930 volts−O volts=930 volt drop in a time of 0.44 sec. This slope of 930 volts/0.44 sec=2113 volts/sec divided by the 32 ergs/cm$^2$/sec intensity gave a sensitivity of 66.1 volts-s/erg/cm$^2$. An alternate sensitivity parameter was obtained in the following way. From the strip chart, $V_{DDP}$=680 volts, so $\frac{1}{2}$ $V_{DDP}$=340 volts. Since the exposure time to reach this level was 0.59 sec., the energy to obtain $\frac{1}{2}$ $V_{DDP}$ was 0.59 sec×32 ergs/cm$^2$sec=18.9 ergs/cm$^2$.

EXAMPLE V

The pigment preparation procedure of Example II was repeated to prepare a pigment for a firsrt sample.

A pigment for a second sample was prepared using the pigment preparation procedure of Example II except that room temperature water was used instead of ice water in the quench tank.

A control pigment for a third sample was prepared from vanadium pentoxide as described in Example I. For accurate comparisons, the process for preparing a control device in this and following Examples was conducted on the same days as the other devices being compared to the control device. Thus, devices for samples 1 and 2 were prepared on the same day as control device 3. The results of the electrical tests of single layer photoreceptors prepared from these samples are set forth in the table below.

Single layer photoreceptor devices were prepared from these pigments using the procedures and proportions described in Example IV. These photoreceptors were tested for electrical properties in the manner described in Example IV. The results of the electrical tests are set forth in the table below.

TABLE

| Pigment Sample No. | Device Dark Decay (volts per sec.) | Device Sensitivity E$\frac{1}{2}$ $V_{DDP}$ (ergs per cm$^2$) |
|---|---|---|
| 1 | 30 | 28 |
| 2 | 20 | 26 |
| 3 | 30 | 24 |

Generally, dark decays within 10 volts per second of the dark decays exhibited by the control are acceptable. However, the photosensitivity (Energy $\frac{1}{2}$ $V_{DDP}$ ergs/cm$^2$) is somewhat less (a larger number indicates less photosensitivity) for Samples 1 and 2 compared to the control Sample 3.

EXAMPLE VI

A pigment for a first sample was prepared as described in Example II. A control pigment for a second sample was prepared from vanadium pentoxide as described in Example I.

Single layer photoreceptor devices were prepared from these pigments using the procedures and proportions described in Example IV. These photoreceptors were tested for electrical properties in the manner described in Example IV. The results of the electrical tests are set forth in the table below:

TABLE

| Pigment Sample No. | Device Dark Decay (volts per sec.) | Device Sensitivity $E_{\frac{1}{2}} V_{DDP}$ (ergs per cm$^2$) |
|---|---|---|
| 1 | 30 | 28 |
| 2 | 20 | 26 |
| 3 | 30 | 24 |

Generally, dark decays within 10 volts per second of the dark decays exhibited by the control are acceptable. However, the photosensitivity (Energy $\frac{1}{2} V_{DDP}$ ergs/cm$^2$) is somewhat less (a larger number indicates less photosensitivity) for Samples 1 and 2 compared to the control Sample 3.

EXAMPLE VI

A pigment for a first sample was prepared as described in Example II. A control pigment for a second sample was prepared from vanadium pentoxide as described in Example I.

Single layer photoreceptor devices were prepared from these pigments using the procedures and proportions described in Example IV. These photoreceptors were tested for electrical properties in the manner described in Example IV. The results of the electrical tests are set forth in the table below:

TABLE

| Pigment Sample No. | Device Dark Decay (volts per sec.) | Device Sensitivity $E_{\frac{1}{2}} V_{DDP}$ (ergs per cm$^2$) |
|---|---|---|
| 1 | 40 | 24 |
| 2 | 30 | 19 |

Again, the photosensitivity is somewhat less for sample 1 compared to the control sample 2.

EXAMPLE VII

A pigment for another sample was prepared utilizing the process described in Example II except that room temperature water was used instead of ice water in the quench tank. A single layer photoreceptor was prepared from this pigment using the procedures and proportions described in Example IV. This photoreceptor was tested for electrical properties in the manner described in Example IV. No charge acceptance of any significance was observed.

EXAMPLE VIII

A standard three phase pigment preparation procedure as described in Example I was employed. However, room temperature water was used instead of ice water in the quench tank. In this case, the single layer photoreceptor device prepared with the resulting pigment using the procedures and proportions described in Example IV accepted a charge but exhibited very high dark decay of 190,275 volts per second compared to a normal acceptable dark decay of 20 to 40 volts. This indicates the presence of a significant quantity of impurities trapped in the pigment particles.

EXAMPLE IX

The pigment preparation procedure of Example I was repeated except that only a 28% excess (as compared to a 55% excess) of vanadium pentoxide was used in Phase I. The yield was about 79% compared to a normal of 92% to 99% with 55% excess vanadium pentoxide. In this case, the single layer photoreceptor device prepared with the resulting pigment using the procedures and proportions described in Example IV exhibited a dark decay of about 35 volts per second and a $E_{\frac{1}{2}} V_{DDP}$ (ergs/cm$^2$) of about 26. The latter photosensitivity value indicates lower photosensitivity versus previously used controls.

EXAMPLE X

The pigment preparation procedure of Example I was repeated except that the exotherm was thermally starved so that a maximum temperature of only about 130° C. was attained in Phase I instead of the normal 198° C.(or boiling point of ethylene glycol). The yield was only 46% compared to the 92% to 99% when the process was repeated with the materials and conditions described in Example I. A single layer photoreceptor device prepared with the resulting thermally starved exotherm pigment using the procedures and proportions described in Example IV exhibited a dark decay of 30 compared to 35 for the control and the $E_{\frac{1}{2}} V_{DDP}$ (ergs/cm$^2$) was 27 compared to 21 of the control. Again the photosensivity of this sample is considerably lower than the control.

EXAMPLE XI

The pigment preparation procedures were repeated except that vanadium trichloride was substituted for vanadium pentoxide and Example II was thereafter followed.

A pigment for a second sample was prepared with vanadium trichloride substituted for vanadium pentoxide but with standard 2-purification steps as in Example I.

A pigment for a third sample was obtained from the second sample and processed in accordance with Phase III of Example I.

A pigment for a fourth sample was obtained as sample 1.

A pigment for a fifth sample was obtained from the fourth sample which was sublimed and twice processed in accordance with Phase III of Example I.

A control pigment for a sixth sample was prepared from vanadium pentoxide as described in Example I in all three phases.

Single layer photoreceptor devices were prepared from these pigments using the procedures and proportions described in Example IV. These photoreceptors were tested for electrical properties in the manner described in Example IV. The results of the electrical tests are set forth in the table below:

TABLE

| Pigment Sample No. | Device Dark Decay (volts per sec.) | Device Sensitivity $E_{\frac{1}{2}} V_{DDP}$ (ergs per cm$^2$) |
|---|---|---|
| 1 | 20 | 44 |

TABLE-continued

| Pigment Sample No. | Device Dark Decay (volts per sec.) | Device Sensitivity $E_{\frac{1}{2}}$ $V_{DDP}$ (ergs per cm$^2$) |
| --- | --- | --- |
| 2 | 20 | 32 |
| 3 | 25 | 32 |
| 4 | 20 | 44 |
| 5 | 20 | 34 |
| 6 | 25 | 19 |

Sample 1 compared to the control sample 6 (44 vs. 19) exhibits less than half the photosensitivity. As to Samples 2 and 3, the use of the Phase II and Phase III steps of Example I improved the photosensitivity from about 44 to about 32 but this improved photosensitivity is still vastly inferior to the device sensitivity of 19 of control pigment 6.

EXAMPLE XII

The pigment preparation procedure of Example II was repeated to prepare a pigment for a first sample.

The pigment preparation procedure of Example II was repeated except that room temperature water was used instead of ice water in the quench tank.

A control pigment for a third sample was prepared from vanadium pentoxide as described in Example I.

Single layer photoreceptor devices were prepared from these pigments using the procedures and proportions described in Example IV. These photoreceptors were tested for electrical properties in the manner described in Example IV. The results of the electrical tests are set forth in the table below:

TABLE

| Pigment Sample No. | Device Dark Decay (volts per sec.) | Device Sensitivity $E_{\frac{1}{2}}$ $V_{DDP}$ (ergs per cm$^2$) |
| --- | --- | --- |
| 1 | 35 | 24 |
| 2 | 35 | 25 |
| 3 | 30 | 19 |

These results generally demonstrate that photosensitivity decreases when an abbreviated pigment preparation process (Example II) is used.

EXAMPLE XIII

The pigment preparation procedure of Example II was repeated to prepare a pigment for a first sample.

A control pigment for a second sample was prepared from vanadium pentoxide as described in Example I.

Single layer photoreceptor devices were prepared from these pigments using the procedures and proportions described in Example IV. These photoreceptors were tested for electrical properties in the manner described in Example IV. The results of the electrical tests are set forth in the table below:

TABLE

| Pigment Sample No. | Device Dark Decay (volts per sec.) | Device Sensitivity $E_{\frac{1}{2}}$ $V_{DDP}$ (ergs per cm$^2$) |
| --- | --- | --- |
| 1 | 35 | 18 |
| 2 | 30 | 17 |

These results generally demonstrate that the photosensitivity decrease may occasionally be insignificant when using an abreviated pigment preparation process (Example II).

EXAMPLE XIV

An overcoated photoreceptor drum was prepared by applying, with spraying with a Model 21 spray gun (commercially available from Binks Inc.) an amine charge transport layer onto a clean aluminum cylinder having a diameter of three inches. The spraying was effected in a laminar airflow booth designed process with volatile solvents containing an entrance means and an exhaust means. This booth also contained a motor driven mandrel with the aluminum cylinder mounted thereon. The spray booth was maintained at a temperature of 20° C. and a relative humidity of about 40 percent.

A charge transport layer was deposited which contained a 4 percent solid solution of a mixture of 65 percent by weight of polycarbonate resin (Merlon M39N, commercially available from Mobay Chemical Co.) and 35 percent by weight of N,N'-diphenyl-N,N'-bis(3-methylphenyl)-1,1'-biphenyl-4,4'-diamine, This mixture was prepared by dissolving a polycarbonate resin in a solution containing 60 percent by volume of methylene chloride and 40 percent by volume 1,1,2-trichloroethane. The polycarbonate resin was dissolved by paint shaking that solution mixture in an amber bottle for one hour and thereafter standing about 24 hours at room temperature.

The resulting solution was then applied to the aluminum cylinder by the spray gun followed by drying at 40° C. for 20 minutes and 160° C. for 60 minutes, the drying being effected in a forced air oven. The coating on the aluminum cylinder had a thickness of 15 microns and contained 35 percent by weight of the amine and 65 percent by weight of the polycarbonate resin.

This transport layer was then coated with a photogenerating layer containing 30 percent by weight vanadyl phthalocyanine dispersed in 70 percent by weight of a polyester. The photogenerating layer was applied by spraying with the Binks Model 21 spray gun described above.

The photogenerating composition was prepared by mixing 30 percent by weight vanadyl phthalocyanine and 70 percent by weight of a polyester (PE-100 Polyester, commercially available from Goodyear.) This mixture was placed in an amber bottle containing in a 60/40 volume ratio of a mixture of solvents of methylene chloride and 1,1,2-trichloroethylene. Steel shot having a diameter of about 3 millimeters was added to the bottle. The contents of the bottle were then mixed on the paint shaker for 24 hours.

The steel shot was thereafter removed by filtration and sufficient solvent was added to achieve a mixture containing 1 percent solids of vanadyl phthalocyanine and the polyester. This mixture was then sprayed onto the above prepared diamine charge transport layer with the Binks spray gun.

After spraying, the coated device was dried at 100° C. for 1.25 hours in a forced air oven to form a photogenerating layer having a dry thickness of about 1 micrometer.

A top ultraviolet absorbing overcoating layer was then applied to the photogenerating layer by placing the coated aluminum cylinder containing the charge transport layer and photogenerating layer in a vacuum chamber and vacuum evaporating on the photogenerating layer an alloy containing 98 percent by weight of selenium and 2 percent by weight of arsenic. The vacuum chamber contained a horizontally rotating motor driven shaft, a string of 4 crucibles having a length longer than the aluminum cylinder and positioned about 12 inches away from the cylinder. These crucibles were loaded with the arsenic-selenium alloy pellets and the vacuum chamber was evacuated to a pressure of less than a micro tor. The aluminum cylinder was rotated at speeds of about 200 revolutions per minute while being treated at 70° C. with radiant heaters. The arsenic selenium alloy was evaporated by heating each of the crucibles to 300° C.

After cooling, the resulting photogenerating layer contained about 2 percent by weight of arsenic and 98 percent by weight of selenium and a thickness of about 1.5 micrometers.

This device was then positively charged to about 800 volts with a corotron, exposed in image configuration to light having a wavelength from about 400 nanometers to about 800 nanometers. Equipment for testing photoreceptors using our improved pigment in the generator layers. Equipment used: Cyclic Xerographic Scanner; Photoreceptor Surface Speed: 4 in/sec; Number of Cycles Tested (max): 100,000 cycles with cycle up and cycle down specification plus or minus 100 volts of Vi=800 volts; Light Intensity: Exposure $2 \times 10^{-5}$ watts/cm$^2$, Erase: $2 \times 10^{-4}$ watts/cm$^2$; Sensitivity (E$\frac{1}{2}$ not used for full device), 25 ergs/cm$^2$; Dark Decay: less than 50 volts/sec; Residual Voltage: less than 50 volts.

Although the invention has been described with reference to specific preferred embodiments, it is not intended to be limited thereto, rather those skilled in the art will recognize that variations and modifications may be made therein which are within the spirit of the invention and within the scope of the claims.

We claim:

1. A process for preparing vanadyl phthalocyanine particles for photoresponsive devices comprising reacting vanadium pentoxide with phthalonitrile and an alcohol at least at an exotherm temperature with agitation, said alcohol having a boiling point of at least 180° C.; filtering the resulting reaction mixture to form a reaction product pigment cake; washing said reaction product pigment cake at lest once with a dipolar aprotic solvent to form a treated pigment cake; drying said treated pigment cake; leaching with agitation said treated pigment cake with a strong acid diluted with water; filtering the resulting mixture to form a leached pigment cake; washing said leached pigment cake at least once with a strong acid diluted with water to form a washed leached pigment cake; washing said leached pigment cake at least once with a solvent comprising water to form a water washed leached pigment cake; forming a strong base slurry by combining said washed leached pigment cake with a strong base diluted with water; heating said strong base slurry with agitation; filtering the resulting mixture to form a strong base treated pigment cake; forming a solvent slurry by combining said strong base treated pigment cake with a dipolar aprotic solvent, heating said solvent slurry with agitation; filtering the solvent slurry to obtain a solvent treated pigment cake; forming an aqueous slurry by combining said solvent treated pigment cake with a solvent comprising water; heating said aqueous slurry with agitation; filtering the aqueous slurry to obtain a washed pigment cake; drying said washed pigment cake; incrementally dissolving with agitation said washed pigment cake in a chilled concentrated strong acid to form a chilled concentrated strong acid solution of vanadyl phthalocyanine; incrementally combining with agitation said solution with chilled water to form a mixture comprising precipitated vanadyl phthalocyanine particles; filtering the resulting mixture to obtain a cake of precipitated vanadyl phthalocyanine particles; forming an aqueous slurry by combining said cake of precipitated vanadyl phthalocyanine particles with a solvent comprising water to form a vanadyl phthalocyanine particle water slurry; heating said vanadyl phthalocyanine particle water slurry; filtering the resulting mixture to obtain a cake of vanadyl phthalocyanine particles; forming a water slurry by combining said cake of vanadyl phthalocyanine particles with water; filtering said water slurry to form a purified pigment cake of vanadyl phthalocyanine; and drying said purified pigment cake of vanadyl phthalocyanine.

2. A process for preparing vanadyl phthalocyanine particles for photoresponsive devices according to claim 1 including maintaining said chilled concentrated strong acid solution of vanadyl phthalocyanine at a temperature below about 15° C.

3. A process for preparing vanadyl phthalocyanine particles for photoresponsive devices according to claim 2 including maintaining said chilled solution of vanadyl phthalocyanine at a temperature between about 5° C. and about 10° C.

4. A process for preparing vanadyl phthalocyanine particles for photoresponsive devices according to claim 1 wherein said chilled strong acid combined with said washed pigment cake is sulfuric acid having a concentration of at least 95 percent by weight.

5. A process for preparing vanadyl phthalocyanine particles for photoresponsive devices according to claim 1 wherein the mole ratio of said phthalonitrile to said vanadium pentoxide is between about 10 to 1 and about 14 to 1.

6. A process for preparing vanadyl phthalocyanine particles for photoresponsive devices according to claim 1 wherein said alcohol has at least two hydroxyl groups.

7. A process for preparing vanadyl phthalocyanine particles for photoresponsive devices according to claim 6 wherein said alcohol having at least two hydroxyl groups is ethylene glycol.

8. A process for preparing vanadyl phthalocyanine particles for photoresponsive devices according to claim 1 wherein the weight proportion of said alcohol to vanadium pentoxide is between about 3:1 and about 30:1.

9. A process for preparing vanadyl phthalocyanine particles for photoresponsive devices according to claim 1 wherein said dipolar aprotic solvent for said washing of said reaction product pigment cake is maintained at a temperature of at least 80° C.

10. A process for preparing vanadyl phthalocyanine particles for photoresponsive devices according to claim 1 including repeating at least once said steps of forming said solvent slurry by combining said strong base treated pigment cake with a dipolar aprotic solvent, heating said solvent slurry with agitation, and filtering said solvent slurry.

11. A process for preparing vanadyl phthalocyanine particles for photoresponsive devices according to claim 1 including forming, prior to said combining of said cake of vanadyl phthalocyanine particles with water, a weak base slurry by combining said cake of vanadyl phthalocyanine particles with water and a weak base, heating said weak base slurry with agitation, and filtering the weak base slurry to obtain a weak base treated pigment cake of vanadyl phthalocyanine at least once.

12. A process for preparing vanadyl phthalocyanine particles for photoresponsive devices according to claim 11 wherein said weak base is ammonium hydroxide.

13. A process for preparing vanadyl phthalocyanine particles for photoresponsive devices according to claim 1 including repeating at least once said steps of forming a water slurry by combining said weak base treated pigment cake with water and filtering said water slurry to form a purified pigment cake of vanadyl phthalocyanine to reduce the electrical conductivity of the vanadyl phthalocyanine filtrate to less than about 10 micromhos.

14. A process for preparing vanadyl phthalocyanine particles for photoresponsive devices according to claim 1 including washing said treated pigment cake at least once with an alcohol solvent to form an alcohol washed pigment cake.

15. A process for preparing vanadyl phthalocyanine particles for photoresponsive devices according to claim 1 including forming, prior to said leaching, a slurry by combining said treated pigment cake with a strong base diluted with water, heating said slurry with agitation, filtering said slurry to form a pigment cake, and washing said pigment cake at least once.

16. A process for preparing vanadyl phthalocyanine particles for photoresponsive devices according to claim 1 wherein said strong acid diluted with water for leaching said treated pigment cake has a concentration between about 60 percent by weight and about 80 percent by weight.

17. A process for preparing vanadyl phthalocyanine particles for photoresponsive devices according to claim 1 wherein said dipolar aprotic solvent is N,N-dimethylformamide.

18. A process for preparing vanadyl phthalocyanine particles for photoresponsive devices according to claim 1 wherein said strong base is sodium hydroxide.

* * * * *